(12) United States Patent
Yanagawa et al.

(10) Patent No.: US 11,140,893 B2
(45) Date of Patent: Oct. 12, 2021

(54) METHOD FOR STOPPING SWIMMING OR CRAWLING OF ADHESION-STAGE LARVAE

(71) Applicant: THE CHUGOKU ELECTRIC POWER CO., INC., Hiroshima (JP)

(72) Inventors: Toshiharu Yanagawa, Hiroshima (JP); Shinsuke Saito, Hyogo (JP); Keiji Yamashita, Hyogo (JP); Kyoko Kamiya, Hyogo (JP); Yoshio Hayashi, Hyogo (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 0 days.

(21) Appl. No.: 15/128,204

(22) PCT Filed: Mar. 24, 2014

(86) PCT No.: PCT/JP2014/058009
§ 371 (c)(1),
(2) Date: Mar. 3, 2017

(87) PCT Pub. No.: WO2015/145526
PCT Pub. Date: Oct. 1, 2015

(65) Prior Publication Data
US 2017/0164602 A1    Jun. 15, 2017

(51) Int. Cl.
| *A01M 29/10* | (2011.01) |
| *C02F 1/30* | (2006.01) |
| *E02B 1/00* | (2006.01) |
| *C02F 3/32* | (2006.01) |
| *A01K 61/54* | (2017.01) |
| *E04B 1/72* | (2006.01) |
| *C02F 103/08* | (2006.01) |

(52) U.S. Cl.
CPC ............ *A01M 29/10* (2013.01); *A01K 61/54* (2017.01); *C02F 1/30* (2013.01); *C02F 3/327* (2013.01); *E02B 1/006* (2013.01); *E04B 1/72* (2013.01); *C02F 2103/08* (2013.01); *C02F 2303/20* (2013.01); *Y02W 10/10* (2015.05)

(58) Field of Classification Search
CPC ...... A01M 29/10; A01M 29/24; A01M 29/28; C02F 1/30; E02B 1/006
See application file for complete search history.

(56) References Cited

U.S. PATENT DOCUMENTS

| 4,235,043 A |   | 11/1980 | Harasawa et al. |
| 4,336,223 A |   | 6/1982 | Hillman |
| 5,308,505 A | * | 5/1994 | Titus ............... A61L 2/0011 210/745 |
| 5,320,749 A | * | 6/1994 | Mullen ............... A61L 2/10 210/199 |
| 5,655,483 A | * | 8/1997 | Lewis ............... A01M 19/00 119/720 |
| 6,149,343 A | * | 11/2000 | Lewis ............... A01M 21/046 119/720 |
| 6,447,720 B1 |   | 9/2002 | Horton, III et al. |
| 7,329,538 B2 |   | 2/2008 | Wainwright et al. |
| 7,695,675 B2 |   | 4/2010 | Kaiser et al. |
| 8,240,312 B2 |   | 8/2012 | Feuerstein et al. |
| 2005/0147579 A1 |   | 7/2005 | Schneider et al. |
| 2005/0232960 A1 |   | 10/2005 | Buccolini et al. |
| 2008/0206095 A1 |   | 8/2008 | Duthie |
| 2011/0226966 A1 |   | 9/2011 | Takahashi et al. |
| 2012/0006995 A1 |   | 1/2012 | Greuel |
| 2016/0143257 A1 |   | 5/2016 | Yanagawa et al. |
| 2017/0172135 A1 |   | 6/2017 | Yanagawa et al. |
| 2017/0290326 A1 |   | 10/2017 | Yanagawa et al. |
| 2017/0290327 A1 |   | 10/2017 | Yanagawa et al. |

FOREIGN PATENT DOCUMENTS

| CN | 106793769 A | 5/2017 |
| EP | 2885968 A1 | 6/2015 |
| EP | 3124441 A1 | 2/2017 |
| JP | 5-228454 A | 9/1993 |
| JP | H05-228454 A | 9/1993 |
| JP | 6-218367 A | 8/1994 |
| JP | 07-037186 U | 7/1995 |
| JP | 7-265867 A | 10/1995 |
| JP | 8-164383 A | 6/1996 |
| JP | 8-164384 A | 6/1996 |
| JP | 11-37666 A | 2/1999 |
| JP | 11-196707 A | 7/1999 |
| JP | 11-278374 A | 10/1999 |
| JP | 2003-301435 A | 10/2003 |
| JP | 3605128 B2 | 12/2004 |
| JP | 2005-144212 A | 6/2005 |
| JP | 2005-144213 A | 6/2005 |

(Continued)

OTHER PUBLICATIONS

Translation of appicant cited document WO2014/027402 dated Feb. 20, 2014.*
Notification of Reason for Rejection for Japanese Patent Application No. 2015-559347, dated Feb. 9, 2016 (English language translation provided) (4 pages).
Decision of Rejection for Japanese Patent Application No. 2015-559347, dated May 10, 2016 (English language translation provided) (3 pages).
Extended European Search Report for European Patent Application No. 14886901.9, dated Feb. 21, 2017 (7 pages).

(Continued)

Primary Examiner — Monica L Barlow
Assistant Examiner — Aaron M Rodziwicz
(74) Attorney, Agent, or Firm — Clark & Elbing LLP

(57) ABSTRACT

The present invention provides a method of stopping larvae of sessile invertebrates in the settlement stage from swimming or crawling in water, by irradiating light comprising the spectrum of 409 to 412 nm and a part of 400 to 440 nm, to the larvae in the settlement stage.

15 Claims, No Drawings

(56) References Cited

FOREIGN PATENT DOCUMENTS

| JP | 2005-144214 A | 6/2005 |
|---|---|---|
| JP | 2010-187637 A | 9/2010 |
| JP | 5301314 B2 | 9/2013 |
| WO | WO-98/30230 A1 | 7/1998 |
| WO | WO-2014/027402 A1 | 2/2014 |
| WO | WO-2014/188347 A1 | 11/2014 |
| WO | WO-2015/145527 A1 | 10/2015 |

OTHER PUBLICATIONS

International Search Report for International Application No. PCT/JP2014/058009, dated May 20, 2014 (English language translation provided) (5 pages).
Written Opinion of the International Search Authority for International Application No. PCT/JP2014/058009, dated May 20, 2014 (English language translation provided) (9 pages).
International Preliminary Report on Patentability for International Application No. PCT/JP2014/058009, dated Sep. 27, 2016 (English language translation provided) (11 pages).
Notification of Reason for Rejection for Japanese Patent Application No. 2015-559346, dated Feb. 9, 2016 (English language translation provided) (4 pages).
Decision of Rejection for Japanese Patent Application No. 2015-559346, dated May 10, 2016 (English language translation provided) (3 pages).
Extended European Search Report for European Patent Application No. 14886734.4, dated Feb. 21, 2017 (7 pages).
International Search Report for International Application No. PCT/JP2014/058010, dated May 20, 2014 (English language translation provided) (5 pages).
Written Opinion of the International Search Authority for International Application No. PCT/JP2014/058010, dated May 20, 2014 (English language translation provided) (7 pages).
International Preliminary Report on Patentability for International Application No. PCT/JP2014/058010, dated Sep. 27, 2016 (English language translation provided) (9 pages).
International Search Report for International Application No. PCT/JP2012/070700, dated Nov. 20, 2012 (2 pages).
International Preliminary Report on Patentability for International Application No. PCT/JP2012/070700, dated Feb. 17, 2015 (6 pages).
English language translation of the Written Opinion of the International Searching Authority for International Application No. PCT/JP2012/070700, dated Nov. 20, 2012 (5 pages).
Kobak, "Impact of light conditions on geotaxis behaviour of juvenile *Dreissena polymorpha*," Folia Malacologica. 10(2):77-82 (2002).
Second Office Action for Chinese Patent Application No. 201280075871.9, dated Aug. 30, 2016 (English language translation provided) (10 pages).
Communication pursuant to Article 94(3) EPC for European Patent Application No. 12891404.1, dated Nov. 4, 2016 (5 pages).
Notice of Final Rejection for Korean Patent Application No. 10-2015-7005863, dated Dec. 27, 2016 (7 pages) (English language translation provided).
Decision of Rejection for Chinese Patent Application No. 2012800758719, dated Mar. 7, 2017 (8 pages) (English language translation provided).
Notification of Reexamination for Chinese Patent Application No. 201280075871.9, dated May 4, 2018 (English language translation provided) (8 pages).

"Mussel Culture Technology", edited and translated by Liu Anni, Wuzhou Publishing House, East Asian Book Company, p. 24, Sep. 1987 (English language translation provided) (3 pages).
"Mussel culture" edited by the Shandong Aquatic School Mariculture Research and Research Group, Agricultural Press, 1st Edition, pp. 49-51, Nov. 1978 (English language translation provided) (6 pages).
Zhang Fuzhen, "Observation of the habits of larvae and seedlings of purple mussels", Journal of Zoology, No. 3, pp. 129-130, 1963 (English language translation provided) (6 pages).
Notification of Reason for Rejection for Japanese Patent Application No. 2015-559345, dated Feb. 2, 2016 (4 pages) (English langauge translation provided).
International Search Report for International Application No. PCT/JP2014/082448, dated Mar. 10, 2015 (5 pages) (English language translation provided).
Written Opinion of the International Searching Authority for International Application No. PCT/JP2014/082448, dated Mar. 10, 2015 (9 pages) (English language translation provided).
International Preliminary Report on Patentability for International Application No. PCT/JP2014/082448, dated Jun. 13, 2017 (11 pages) (English langauge translation provided).
Extended European Search Report for European Patent Application No. 14907701.8, dated Oct. 2, 2017 (5 pages).
Notification of Reason for Refusal for Korean Patent Application No. 10-2017-7007814, dated Jun. 20, 2018 (13 pages) (English language translation provided).
Chemical Method. Marine Life Contamination Countermeasure Manual. Edited by the Japan Society of Electrochemical Society and Marine Organism Contamination Countermeasure, Gihodo Publishing, pp. 106-110 (1991) (English language machine translation provided) (6 pages).
Chlorine Injection. Handbook of Contamination Countermeasures for Power Plant Seawater Facilities. Edited by Thermal and Nuclear Power Engineering Society, Kousesha Kouseikaku Publishing, pp. 118-132 (2014) (English language machine translation provided) (17 pages).
Extended European Search Report for European Patent Application No. 15887495.8, dated Oct. 24, 2017 (9 pages).
First Office Action for Chinese Patent Application No. 201580052149.7 dated May 2, 2018 (English language translation provided) (10 pages).
International Preliminary Report on Patentability for International Application No. PCT/JP2015/059798, dated Oct. 3, 2017 (English language translation provided) (9 pages).
International Search Report for International Application No. PCT/JP2015/059798, dated Apr. 28, 2015 (English language translation provided) (3 pages).
Kawabe, Chlorine. Compendium of Measures Against Large Scale Adherence. Edited by the Japan Society of Electrochemical Society and Marine Organism Contamination Countermeasure, pp. 97-102 (1998) (English language machine translation provided) (8 pages).
Notification of Reason for Refusal for Korean Patent Application No. 10-2017-7008062, dated Jun. 20, 2018 (15 pages) (English language translation provided).
Notification of Reason for Rejection for Japanese Patent Application No. 2015-559343, dated Mar. 15, 2016 (English language translation provided) (4 pages).
Written Opinion of the International Searching Authority for International Application No. PCT/JP2015/059798, dated Apr. 28, 2015 (English language translation provided) (7 pages).

\* cited by examiner

METHOD FOR STOPPING SWIMMING OR CRAWLING OF ADHESION-STAGE LARVAE

TECHNICAL FIELD

The present invention relates to methods of stopping larvae of sessile invertebrates in the settlement stage ("fuchaku-ki") from swimming or crawling in water.

BACKGROUND ART

In power plants, such as thermal or nuclear power plants that use seawater as a coolant, marine invertebrates such as barnacles and bivalves including mussels often settle inside of intake structures through which sea water is drawn from the sea and is supplied to condensers as well as outfall structures through which the sea water having passed through the condensers is discharged into the sea. An increased amount of settled marine invertebrates may possibly cause clogging of the coolant passages, resulting in a problem of, for example, reduction in cooling capacity. To deal with the problem, a chlorine-based substance such as a sodium hypochlorite solution or chlorine dioxide is injected into the coolant and thus the settlement of marine invertebrates on the heat exchange pathways has been suppressed (Japanese Patent Laid-open Nos, 7-265867, 11-37666, 2005-144212, 2005-144213, and 2005-144214, and Japanese Patent No. 3605128). Other methods have also been developed which use a photocatalyst (Japanese Patent Laid-open No. 11-278374) or a laser beam (Japanese Patent Laid-open Nos. 2003-301435, 06-218367, and 08-164384).

SUMMARY OF THE INVENTION

Problem to be Solved by the Invention

An object of the present invention is to provide methods of stopping larvae of sessile invertebrates in the settlement stage from swimming or crawling in water.

Means to Solve the Problem

The present inventors found that larvae in the settlement stage tend to stop from swimming or crawling in water when they are irradiated with light including the spectrum of 409 to 412 nm. The present invention was thus completed.

One aspect of the present invention is a method of stopping a Pteriomorphia larva in a settlement stage from swimming or crawling in water, including the step of irradiating light including the spectrum of 409 to 412 nm and a part of 400 to 440 nm, to the larva in the settlement stage. It is preferable that the light has a peak in the wavelength range between 409 nm and 412 nm. It is preferable that the light to the larvae in the settlement stage has the maximum intensity of 59.4 $\mu Wcm^{-2}nm^{-1}$ or higher in the wavelength range between 409 nm and 412 nm. It is preferable that the light includes the spectrum of 400 to 420 nm. It is preferable that the light is not a laser beam. The light may be an LED beam. The water may be seawater. The sessile invertebrate may be a mussel or an oyster, and is preferably a pediveliger of *Mytilus galloprovincialis* or *Crassostrea gigas*.

EMBODIMENT FOR CARRYING OUT THE INVENTION

The objects, features, advantages, and ideas of the present invention are apparent to those skilled in the art from consideration of the description of the present specification. Furthermore, those skilled in the art can easily reproduce the present invention from the description of the present specification. The mode and the specific example described below represent a preferable embodiment of the present invention, which is given for the purpose of illustration or description. The present invention is not limited thereto. It is obvious to those skilled in the art that various changes and modifications may be made according to the descriptions of the present specification without departing from the spirit and scope of the present invention disclosed herein.

The method of stopping a larva of a sessile invertebrate in a settlement stage from swimming or crawling in water according to the present invention includes the step of irradiating light including the spectrum of 409 to 412 nm and a part of 400 to 440 nm, to the larva in the settlement stage. It is thus possible to stop pediveligers which are larvae in the settlement stage of, for example, mussels or oysters from swimming or crawling in water by causing them to exhibit a shell-closure response to retract their velum (a structure used for swimming) and foot into the shell.

Target sessile invertebrates are animals that drift in the sea in the early larval stage and then settle on an appropriate substrate during the larval settlement stage to metamorphose into adults. The sessile invertebrates include Pteriomorphia, in particular, mussels and oysters. To stop the larvae of sessile invertebrates in the settlement stage from swimming or crawling in water is, therefore, preferably performed, but not limited to, in the seawater. Instead, it may be performed in freshwater or salt water with a concentration different from seawater, such as a mixture of freshwater and seawater.

Mussel is the common name for bivalve mollusks in the family Mytilidae and it includes, for example, *Modiolinae* such as *Modiolus nipponicus*, *Lithophaginae* such as *Lithophaga curta*, *Crenellinae* such as *Arvella manshurica* and *Musculista senhousia*, and *Mytilinae* such as *Mytilus coruscus*, *Limnoperna fortunei*, and *Mytilus galloprovincialis*. Oyster is the common name for mollusks in the family Ostreidae and it includes, for example, *Crassostrea* such as *Crassostrea gigas* and *Crossostrea nippon* and *Ostrea* such as *Ostrea denselamellosa* and *Ostrea edulis*.

The target developmental stage is preferably the larval settlement stage. For mussels and oysters, larvae in the settlement stage are equivalent to plantigrades and pediveligers. This is because the present invention can prevent settlement of the larvae in the settlement stage onto a substrate. The substrate to which the larvae in the settlement stage are expected to settle is not particularly limited; examples include seawater intake and outfall systems in power plants, coastal aquaculture facilities or fishery facilities.

The light to be irradiated to larvae in the settlement stage includes the spectrum of 409 to 412 nm and a part of 400 to 440 nm. The term "a part" is intended not to include "full" in this specification. It is preferable that the light includes the full spectrum of 400 to 420 nm. The light may include ultraviolet (meaning wavelengths shorter than 400 nm), visible light (meaning wavelengths of 400 to 830 nm), and/or infrared (meaning wavelengths longer than 830 nm). Light with wavelengths in the range between 400 nm and 420 nm can be transmitted better through seawater than ultraviolet light. Accordingly, the present invention can have effects of light on a larger area compared with methods using light in the ultraviolet range only. In addition, as shown in Examples, it is preferable that the light has a peak in the wavelength range between 409 nm and 412 nm. This light may not be a laser beam.

The intensity of the irradiation of the light is not specifically limited and can appropriately and easily be determined by those skilled in the art depending on the environment to be irradiated (e.g., quality, depth, and clarity of the water). The maximum intensity of the light to be irradiated to the larvae in the settlement stage in the wavelength range between 409 nm and 412 nm is preferably 59.4 $\mu Wcm^{-2}nm^{-1}$ or higher and more preferably 118.4 $\mu Wcm^{-2}nm^{-1}$ or higher. The time of the irradiation of the light is also not specifically limited and can be appropriately and easily determined by those skilled in the art depending on the environment to be irradiated. The time of the irradiation can be set at, for example, 3 seconds or longer, 10 seconds or longer, 30 seconds or longer, 100 seconds or longer, or 5 minutes or longer. The irradiation can be continuous or intermittent. When the irradiation is intermittent, the total time of irradiation of the light is preferably as described above. Furthermore, no photocatalyst is used to stop larvae of sessile invertebrates in the settlement stage from swimming or crawling in water, but a photocatalyst may be used to kill the larvae after they have been stopped from swimming or crawling by using light including the spectrum of 409 to 412 nm.

The irradiation method is not particularly limited, but it can utilize devices such as an LED emitter, a mercury lamp, and a fluorescent tube as the irradiator. An LED emitter is preferred.

EXAMPLE

In this example, pediveliger larvae (shell length: 217-348 µm) of *Mytilus galloprovincialis,* which are those in the settlement stage of Pteriomorphia, were placed one by one in Petri dishes containing 4 mL of seawater (water depth: 2 mm) filtered through a 3-µm filter, the Petri dish containing the larva was each set on a stage of a stereomicroscope (OLYMPUS SZX12) and an LED beam was irradiated to the stage.

To irradiate the LED beam, an LED panel (LED panel model: ISL-150X150UU375TPNL manufactured by CSS Inc.) with LED light-emitting elements emitting light with a peak in the wavelength range between 370 and 380 nm, an LED panel (LED panel model: ISL-150X150-VV-TPNL manufactured by CSS Inc.) with LED light-emitting elements emitting light with a peak in the wavelength range between 409 and 412 nm, an LED panel (LED panel model: ISL-150X150BB45-TPNL manufactured by CSS Inc.) with LED light-emitting elements that emits with a peak in the wavelength range between 440 and 460 nm, an LED panel (LED panel model: ISL-150X150-BB-TPNL manufactured by CSS Inc.) with LED light-emitting elements that emits light with a peak in the wavelength range between 460 and 480 nm, and an LED panel (LED panel model: ISL-150X150-GG-TPNL manufactured by CSS Inc.) with LED light-emitting elements that emits light with a peak in the wavelength range between of 515 and 535 nm were used. The LED panels were placed so that the distance between the center of each LED panel and the center of the glass dish was 9.5 cm. Light between wavelengths of 409 and 412 nm was not in the light emitted from the light-emitting elements other than the LED light-emitting elements that emits light with a peak in the wavelength range between 409 and 412 nm.

The LED light-emitting elements emitting light with a peak in the wavelength range between 409-412 nm were adjusted in such a manner that the irradiance at the place 9.5 cm away from the LED panel was 5 W/m² to 60 W/m², using an irradiance meter (Pyranometer LI-200 manufactured by MEIWAFOSIS CO, LTD.) The spectral irradiance at the peak was measured using, a multi-purpose spectroradiometer (MSR-7000N manufactured by Opto Research Corporation) at that position. The result is given in Table 1.

TABLE 1

| Irradiance (W/m²) | Spectral irradiance at the peak ($\mu Wcm^{-2}nm^{-1}$) |
|---|---|
| 60 | 178.2770 |
| 40 | 118.3787 |
| 20 | 59.3560 |
| 10 | 29.7123 |
| 5 | 14.5306 |

The irradiation was continued until larvae closed their shell. The irradiation time before the shell closure and the time length during which larvae kept their shell closed after the irradiation was terminated were measured. If larvae did not close their shell after 5 minutes, the irradiation was terminated on the spot. The results of the tests are given in Table 2 below.

TABLE 2

| Peak wavelength of irradiated light | Irradiance at Petri dish position (W/m²) | Number of larvae tested | Number of larvae that closed their shell | Percentage of shell closure (%) | Average irradiation time before shell closure (sec.) (average ± SD) | Average time length during which the larva kept its shell closed (sec.) (average ± SD) |
|---|---|---|---|---|---|---|
| 370-380 nm | 10 | 16 | 8 | 50.0 | 24.9 ± 31.2 | 210.4 ± 75.6 |
| 409-412 nm | 60 | 26 | 26 | 100 | 18.7 ± 19.4 | 126.2 ± 128.7 |
|  | 40 | 16 | 16 | 100 | 34.4 ± 56.0 | 190.9 ± 137.5 |
|  | 20 | 16 | 13 | 81.3 | 118.8 ± 83.7 | 139.9 ± 82.5 |
|  | 10 | 16 | 7 | 43.8 | 55.4 ± 75.5 | 103.3 ± 43.2 |
|  | 5 | 16 | 1 | 6.3 | 23.0 ± 0.0 | 196 ± 0.0 |
| 440-460 nm | 60 | 19 | 0 | 0 | not closed | — |
| 460-480 nm | 60 | 5 | 0 | 0 | not closed | — |
| 515-535 nm | 40 | 5 | 0 | 0 | not closed | — |

The larvae showed a clear shell-closure response and stopped from swimming or crawling when they were irradiated with the light having a peak in the wavelength range between 409 nm and 412 nm. The higher the irradiance was, the shorter the average irradiation time was before the larvae in the settlement stage closed their shell. When the light having a peak in the wavelength range between 409 nm and 412 nm was irradiated at an irradiance of 60 W/m, a larva closed its shell after only 3 seconds and kept its shell closed for 392 seconds after the irradiation was terminated. Another larva closed its shell after 6 seconds and kept its shell closed for 500 seconds after the irradiation was terminated. The higher the irradiance was, the higher the percentage of the individuals that closed their shells was. On the contrary, with the LED beams having a peak in the wavelength range between 440 nm and 460 nm or longer, the larvae did not exhibit any response after being irradiated with light, and did not stop swimming or crawling.

When the light having a peak in the wavelength range between 370 nm and 380 nm was irradiated, some individuals closed their shell. However, considering that the light comprising the spectrum of 400 to 420 nm has a higher transmittance in the seawater than the ultraviolet light (having wavelengths shorter than 400 nm), it is particularly effective to irradiate light including the spectrum of 409 to 412 nm than to irradiate light only in the ultraviolet range to stop larvae in the settlement stage from swimming or crawling in water.

INDUSTRIAL APPLICABILITY

The present invention makes it possible to provide methods of stopping larvae of sessile invertebrates in the settlement stage from swimming or crawling in water.

The invention claimed is:

1. A method of stopping a larva of Pteriomorphia in a settlement stage from swimming or crawling in water, comprising the step of:

irradiating light consisting of a part of a spectrum of 400 nm to 440 nm to the larva in the settlement stage, wherein the light irradiating the larva in the settlement stage has a peak wavelength in a range between 409 nm and 412 nm.

2. The method according to claim 1, wherein the light to the larvae in the settlement stage has a spectral irradiance of 59.4 µWcm$^{-2}$ nm$^{-1}$ or higher in a wavelength range between 409 nm and 412 nm.

3. The method according to claim 2, wherein the light is not a laser beam.

4. The method according to claim 1, wherein the part of the spectrum consists of a part of a spectrum of 400 nm to 420 nm.

5. The method according to claim 4, wherein the light is not a laser beam.

6. The method according to claim 1, wherein the light is not a laser beam.

7. The method according to claim 1, wherein the light is an LED beam.

8. The method according to claim 7, wherein the light is not a laser beam.

9. The method according to claim 1, wherein the water is seawater.

10. The method according to claim 9, wherein the light is not a laser beam.

11. The method according to claim 1, wherein the sessile invertebrate is a mussel or an oyster.

12. The method according to claim 11, wherein the light is not a laser beam.

13. The method according to claim 1, wherein the larva in the settlement stage is a pediveliger of *Mytilus galloprovincialis* or *Crassostrea gigas*.

14. The method according to claim 13, wherein the light is not a laser beam.

15. The method according to claim 1, wherein the part of the spectrum consists of a spectrum of 400 nm to 420 nm.

* * * * *